United States Patent [19]
Walter

[11] 3,905,000
[45] Sept. 9, 1975

[54] ELECTRONIC COMPONENT ASSEMBLY
[75] Inventor: Richard Kupp Walter, Lititz, Pa.
[73] Assignee: RCA Corporation, New York, N.Y.
[22] Filed: Feb. 7, 1975
[21] Appl. No.: 548,008

[52] U.S. Cl. ............... 336/65; 317/101 CC; 336/83; 336/210
[51] Int. Cl.² .......................................... H01F 27/26
[58] Field of Search ... 317/101 CC, 101 CP, 249 D; 174/35 C; 336/65, 83, 210, 212

[56] References Cited
UNITED STATES PATENTS
2,586,854   2/1952   Myers ............................. 174/35 C
FOREIGN PATENTS OR APPLICATIONS
1,266,632   3/1972   United Kingdom ........... 317/101 CP Primary Examiner—Thomas J. Kozma
Attorney, Agent, or Firm—Glenn H. Bruestle; Carl L. Silverman

[57] ABSTRACT

A shaft is utilized for fastening a pair of core members together and for mounting the pair of core members onto a mounting platform. The core members include recesses which contain an electronic component. The shaft extends through the core members and projects beyond a surface of each of the members. The shaft includes a flange abutting one of the core members. A fastener slidably located on the shaft mechanically fastens the pair of core members together and against the flange. The assembly can be easily assembled and mounted onto a mounting platform by inserting one end of the shaft through an opening in the platform.

10 Claims, 1 Drawing Figure

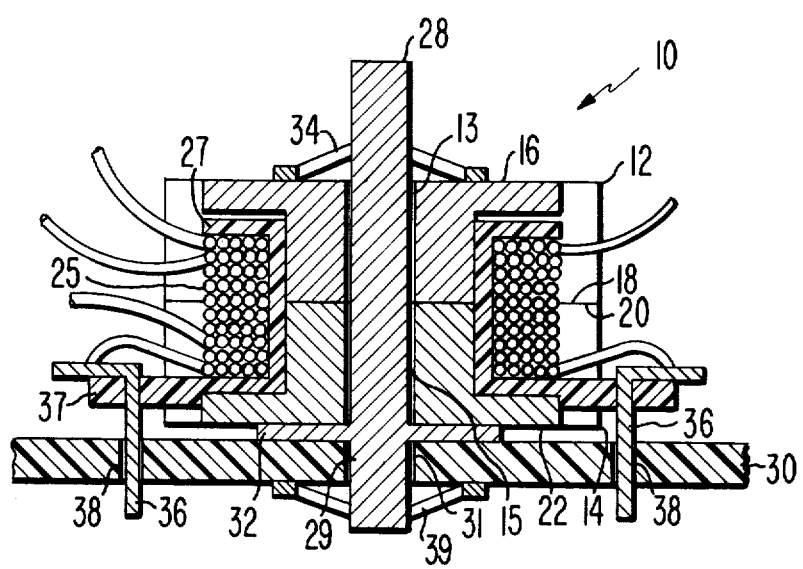

ELECTRONIC COMPONENT ASSEMBLY

BACKGROUND OF THE INVENTION

This invention relates to an electronic component assembly which includes a pair of core members, and particularly to such an assembly in which a shaft is utilized for fastening the core members together and for mounting the core members onto a mounting platform.

Well known devices, for example, transformers, chokes, coils, etc., often utilize magnetic materials, such as ferrite cores. Generally, a ferrite core is made from iron and other oxides and is usually shaped like a doughnut. Ferrite cores are useful in circuits and magnetic memories as they can be magnetized and demagnetized very rapidly. Generally, the devices consist of two ferrite core halves which are bonded together, usually with a potting compound. A nut and bolt may be used to hold the core halves together in proper position while the core halves are potted together. After the core halves are bonded together by the potting compound, the nut and bolt may also be used for mounting the assembly onto a mounting platform.

Although conventional electronic component assemblies are adequate for some purposes, these assemblies suffer from certain disadvantages. For example, in cases where a nut and bolt are used to maintain the core halves in proper position prior to applying the potting compound, it has been found that the nut and bolt are often tightened too securely so as to crack the ferrite cores. Also, conventional assemblies are rather difficult to install onto mounting platforms since generally the nut must be loosened, removed, and then replaced and retightened. Thus, it would be desirable to develop an electronic component assembly which would eliminate the need for potting or elaborate hardware, e.g., external clamps, to hold the core halves together.

SUMMARY OF THE INVENTION

An electronic component assembly includes a pair of core members. Each of the core members includes a pair of opposing surfaces with each of the core members having an opening therethrough between the surfaces. The core members are disposed with a surface of one of the core members in abutting relationship with a surface of the other one of the core members and with the openings in aligned relation. A shaft extends through the openings in the core members and beyond the non-abutting surface of each of the core members. The shaft includes a flange abutting the non-abutting opposing surface of one of the core members. A portion of the shaft projects beyond the flange so as to provide means for mounting the assembly onto a mounting platform. Means are provided for fastening the pair of core members together and on the shaft. The fastening means is disposed in intimate relation with the other one of the core members.

BRIEF DESCRIPTION OF THE DRAWING

The Drawing is a cross-sectional view of one form of an electronic component assembly of the present invention.

DETAILED DESCRIPTION OF THE INVENTION

Referring initially to the Drawing, one form of an electronic component assembly of the present invention is generally designated as 10. The electronic component assembly 10 includes, for example, a pair of ferrite core members 12 and 14, e.g., of a material such as iron and iron oxide. The core member 12 includes opposing surfaces 16 and 18 and the core member 14 includes opposing surfaces 20 and 22. The core members 12 and 14 respectively, include openings 13 and 15 which extend therethrough between the opposing surfaces. As shown in the Drawing, the core members 12 and 14 are shaped so as to include recesses suitable for containing an electronic element, e.g., a conventional coil 25 wound on an insulating spool 27. The core members 12 and 14 are disposed with the surface 18 of the core member 12 in abutting relation with the surface 20 of the core member 14 and with the openings 13 and 15 in aligned relation.

A shaft 28 extends through the openings 13 and 15 in the core members 12 and 14 and beyond the non-abutting opposing surfaces 16 and 22. The shaft 28 includes a flange 32 abutting the non-abutting opposing surface 22 of the core member 14. In some cases it may be preferable to employ a shaft 28 of a conductive material, e.g., a copper alloy such as brass. A fastener 34, preferably a conventional spring-tension nut, is slidably located on the shaft 28 and in intimate relation with the core member 12. The fastener 34 mechanically fastens the core members 12 and 14 together and against the flange 32. It may be desirable in some cases to insert a spacer (not shown) between the core members 12 and 14.

A portion 29 of the shaft 28 projects beyond the flange 32 so as to provide means for mounting the core members 12 and 14 onto a mounting platform 30. For example, as shown in the Drawing, the portion 29 of the shaft 28 which projects beyond the flange 32 can be employed to insert the assembly 10 into operating position onto the mounting platform 30. In such a case, the mounting platform 30 is provided with an opening 31 for receiving the portion 29 of the shaft 28. When the assembly 10 is mounted in position onto the mounting platform 30, it may be desirable to securely fasten the shaft portion 29, i.e., the assembly 10, to the platform 30. For example, it may be desirable to employ a fastener 39, such as the spring-tension nut previously described. Preferably, the flange 32 is of a sufficient size in relation to the assembly 10 so as to provide a stable base when the assembly 10 is mounted onto the mounting platform 30, i.e., the diameter of the flange 32 is at least one-half the diameter of the opposing surface 22 of the core member 14.

Terminal pins 36 for electrical connection to the electronic element, i.e., the coil 25, may be disposed in substantially parallel relation to the shaft portion 29, as shown in the Drawing. Although only two terminal pins 36 are shown in the Drawing, it is apparent that additional terminal pins 36 may be provided as required. The terminal pins 36 can be electrically insulated from each other through the use of an insulating platform 37 which is part of the insulating spool 27. As shown in the Drawing, the terminal pins 36 which extend downward, i.e., parallel to the shaft portion 29, can be received by terminal pin receptacles 38 in the mounting platform 30 such that the assembly 10 can be easily inserted (and securely mounted) into operating position onto the mounting platform 30. Since the flange 32 provides a good electrical connection to the assembly 10, an electrically conductive shaft 28 can function as an electrical ground connection for the assembly 10.

In the construction of the electronic component assembly 10 of the present invention, the core members 12 and 14 are provided with the desired electronic element, e.g., the coil 25, and disposed with surfaces 18 and 20 abutting each other and with openings 13 and 15 in aligned relation. The shaft 28 is then inserted into the openings 13 and 15 such that the flange 32 abuts the non-abutting opposing surface 22 of the core member 14. Then the fastener 34 is applied for mechanically fastening the core members 12 and 14 together and against the flange 32. The use of a spring-tension nut as the fastener 34 allows one to easily and uniformly apply the proper fastening force so as to minimize the possibility of damaging the ferrite cores 12 and 14. By the proper choice of the material and size of the spring-tension nut, a predetermined fastening force can be reproducibly obtained, as is known in the art. Thus, the assembly 10 eliminates the need for potting, or for elaborate hardware, e.g., clamps, nuts and bolts, to hold the core members together.

Through a careful choice of the diameter of the shaft 34 and the diameter of the openings 13 and 15, e.g., the openings slightly larger than the shaft, positive alignment of the core members 12 and 14 can be obtained. Furthermore, the electronic component assembly of the present invention provides for easy installation and soldering to mounting platforms, e.g., circuit boards. In addition, through the use of the spring-tension nut, the electronic component assembly of the present invention achieves more uniform pressure between the core members than in conventional assemblies since the fastening force is more uniformly applied. Finally, it has been found that the electronic component assemblies of the present invention which include spring-tension nuts are more rugged than conventional assemblies, i.e., they do not vibrate, loosen, or otherwise fail as frequently as conventional assemblies.

Although the electronic component assembly of the present invention has been described having a particular electronic element therein, it is apparent that the assembly is also successful with other electronic elements. Also, although the electronic component assembly of the present invention has been described having ferrite core members, the assembly is useful for other applications. For example, other electronic components, such as capacitors, resistors and inductors, can be enclosed by core members which are not ferrite materials. Also, although the magnetic core assembly of the present invention has been described as employing a spring-tension nut for mechanically fastening the core members together, any other conventional fastener could also be employed, e.g., nuts, clamps, as long as the fastener utilized is disposed in intimate relation with the appropriate core member. Thus, the electronic component assembly of the present invention enables more consistant pressure, rapid assembly, and less expensive hardware costs in the fabricating of many electronic devices, especially those which utilize ferrite cores.

I claim:
1. An electronic component assembly comprising:
    a pair of core members each having a pair of opposing surfaces and each having an opening therethrough between said surfaces, said core members disposed with a surface of one of said core members in abutting relation with a surface of the other one of said core members and with said openings in aligned relation,
    a shaft extending through said openings in said members and beyond the non-abutting opposing surface of each of said core members, said shaft including a flange of one-piece construction with said shaft abutting the non-abutting opposing surface of one of said core members with a portion of said shaft projecting beyond said flange so as to provide means for mounting onto a mounting platform, and
    means fastening said pair of core members together and on said shaft, said means disposed in intimate relation with the other one of said core members.
2. An electronic component assembly in accordance with claim 1 in which said means fastening said pair of core members together comprises a fastener slidably located on said shaft.
3. An electronic component assembly in accordance with claim 2 in which said fastener comprises a spring-tension nut.
4. An electronic component assembly in accordance with claim 2 which includes means securely fastening said shaft portion to said mounting platform.
5. An electronic component assembly in accordance with claim 4 in which said means securely fastening said shaft portion to said mounting platform comprises a fastener slidably located on said shaft portion.
6. An electronic component assembly in accordance with claim 5 in which said fastener comprises a spring-tension nut slidably located on said shaft portion.
7. An electronic component assembly in accordance with claim 2 in which said flange is of sufficient size so as to provide a stable base when said assembly is mounted onto said mounting platform.
8. An electronic component assembly in accordance with claim 7 in which said shaft is of an electrically conductive material.
9. An electronic component assembly in accordance with claim 8 in which terminal pins for electrical connection are disposed in substantially parallel relation to said shaft portion such that said assembly can be inserted into operating position onto said mounting platform.
10. An electronic component assembly in accordance with claim 9 in which said core members comprise magnetic materials.

* * * * *